United States Patent
Thomas

(10) Patent No.: US 10,343,310 B2
(45) Date of Patent: Jul. 9, 2019

(54) CONSUMABLE BITUMEN BAG FOR PACKAGING BITUMEN AND METHOD OF FORMING THE BITUMEN BAG

(71) Applicant: EPS Offshore Oil Trading PLC, Roseau (DM)

(72) Inventor: Gordon William Thomas, Singapore (SG)

(73) Assignee: EPS OFFSHORE OIL TRADING PLC, Roseau (DO)

( * ) Notice: Subject to any disclaimer, the term of this patent is extended or adjusted under 35 U.S.C. 154(b) by 362 days.

(21) Appl. No.: 15/201,608

(22) Filed: Jul. 4, 2016

(65) Prior Publication Data

US 2016/0311568 A1 Oct. 27, 2016

Related U.S. Application Data

(63) Continuation-in-part of application No. 13/984,030, filed as application No. PCT/SG2011/000063 on Feb. 10, 2011, now Pat. No. 9,580,196.

(51) Int. Cl.
*B65B 3/04* (2006.01)
*B29C 41/08* (2006.01)
*B65B 63/08* (2006.01)
*B29C 41/04* (2006.01)
*B29C 41/36* (2006.01)
*B29C 41/40* (2006.01)
*B29C 41/42* (2006.01)
(Continued)

(52) U.S. Cl.
CPC .............. *B29C 41/08* (2013.01); *B29C 33/46* (2013.01); *B29C 33/48* (2013.01); *B29C 33/485* (2013.01); *B29C 33/505* (2013.01); *B29C 41/04* (2013.01); *B29C 41/085* (2013.01); *B29C 41/36* (2013.01); *B29C 41/40* (2013.01); *B29C 41/42* (2013.01); *B29C 69/001* (2013.01); *B65B 3/02* (2013.01); *B65B 3/04* (2013.01); *B65B 3/08* (2013.01); *B65B 7/02* (2013.01); *B65B 9/24* (2013.01); *B65B 51/32* (2013.01); *B65B 63/08* (2013.01); *B29K 2095/00* (2013.01); *B29K 2883/00* (2013.01); *B29L 2031/7128* (2013.01); *B65B 7/2807* (2013.01)

(58) Field of Classification Search
CPC ... B29C 41/085; B29C 33/505; B29C 33/485; B29C 33/48; B29C 33/46; B29K 2095/00
See application file for complete search history.

(56) References Cited

U.S. PATENT DOCUMENTS 3,291,882 A * 12/1966 Warner .................... B29C 33/60
264/300
3,607,998 A * 9/1971 Goodridge ............. B29C 33/505
264/121
(Continued)

*Primary Examiner* — Benjamin A Schiffman
(74) *Attorney, Agent, or Firm* — Pyprus Pte Ltd

(57) ABSTRACT

The present invention describes a method (600, 600a) of forming bitumen bags (605) for packaging bitumen products into blocks or slabs. Each block/slab of bitumen (200,200a, 200b,200c) is encapsulated in the bitumen bag, which is composed of a bitumen compound (160). The bitumen compound (160) is made up of about 10-30% by weight of natural bitumen and about 5-25% by weight of a synthetic rubber polymer and copolymers. The bitumen compound (160) is melted with the bitumen content and is fully miscible with the molten bitumen, leaving no residue but enhances the physical properties of the resultant bitumen mixture.

12 Claims, 16 Drawing Sheets

(51) Int. Cl.
  *B29C 69/00*   (2006.01)
  *B65B 7/02*    (2006.01)
  *B29C 33/48*   (2006.01)
  *B29C 33/46*   (2006.01)
  *B29C 33/50*   (2006.01)
  *B65B 51/32*   (2006.01)
  *B65B 3/02*    (2006.01)
  *B65B 3/08*    (2006.01)
  *B65B 9/24*    (2006.01)
  *B29K 95/00*   (2006.01)
  *B29L 31/00*   (2006.01)
  *B65B 7/28*    (2006.01)

(56) References Cited

U.S. PATENT DOCUMENTS

| 2006/0113714 A1* | 6/2006 | Giloh | B29C 33/46 |
| | | | 264/517 |
| 2007/0027235 A1 | 2/2007 | Marchal | |
| 2011/0198777 A1* | 8/2011 | Liou | B29C 41/085 |
| | | | 264/209.2 |

* cited by examiner

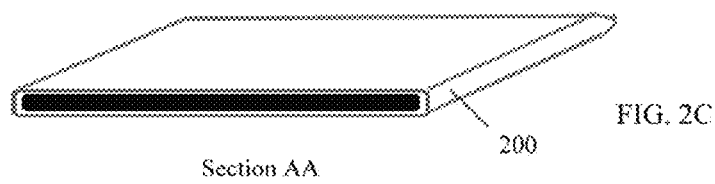
FIG. 2C
Section AA
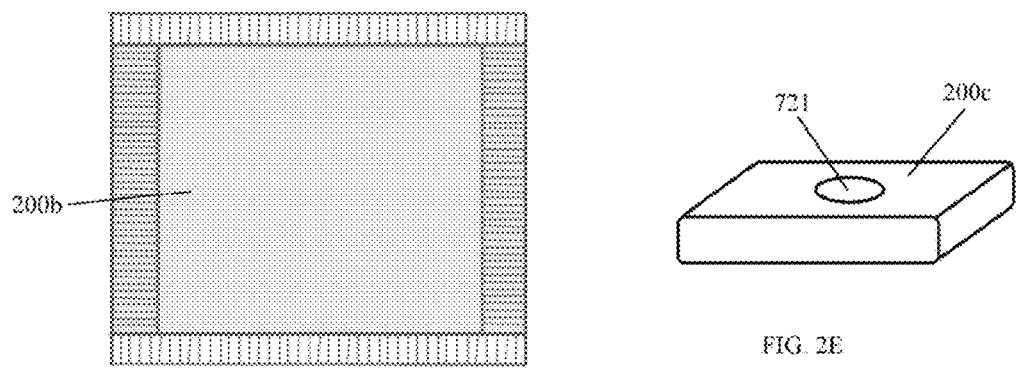
FIG. 2D
FIG. 2E
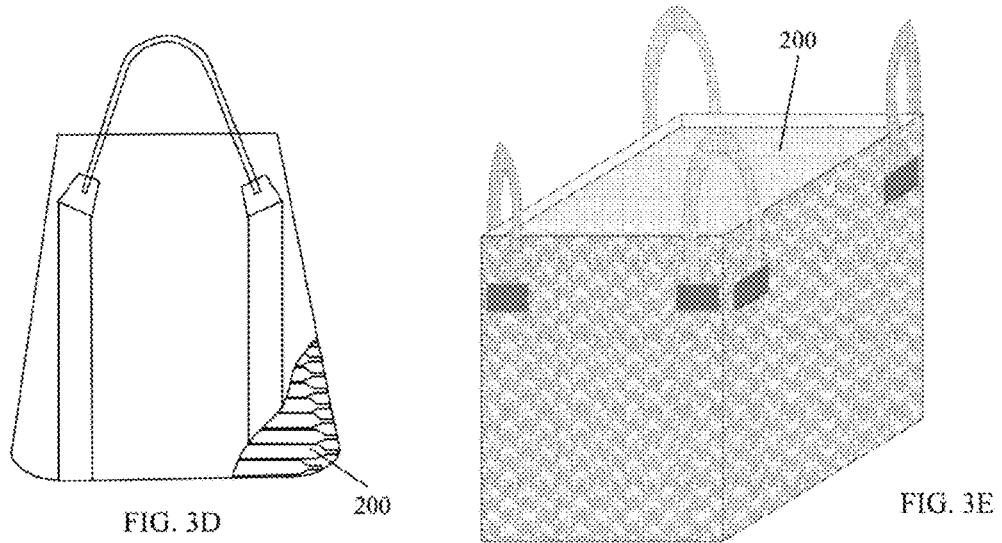
FIG. 3D
FIG. 3E

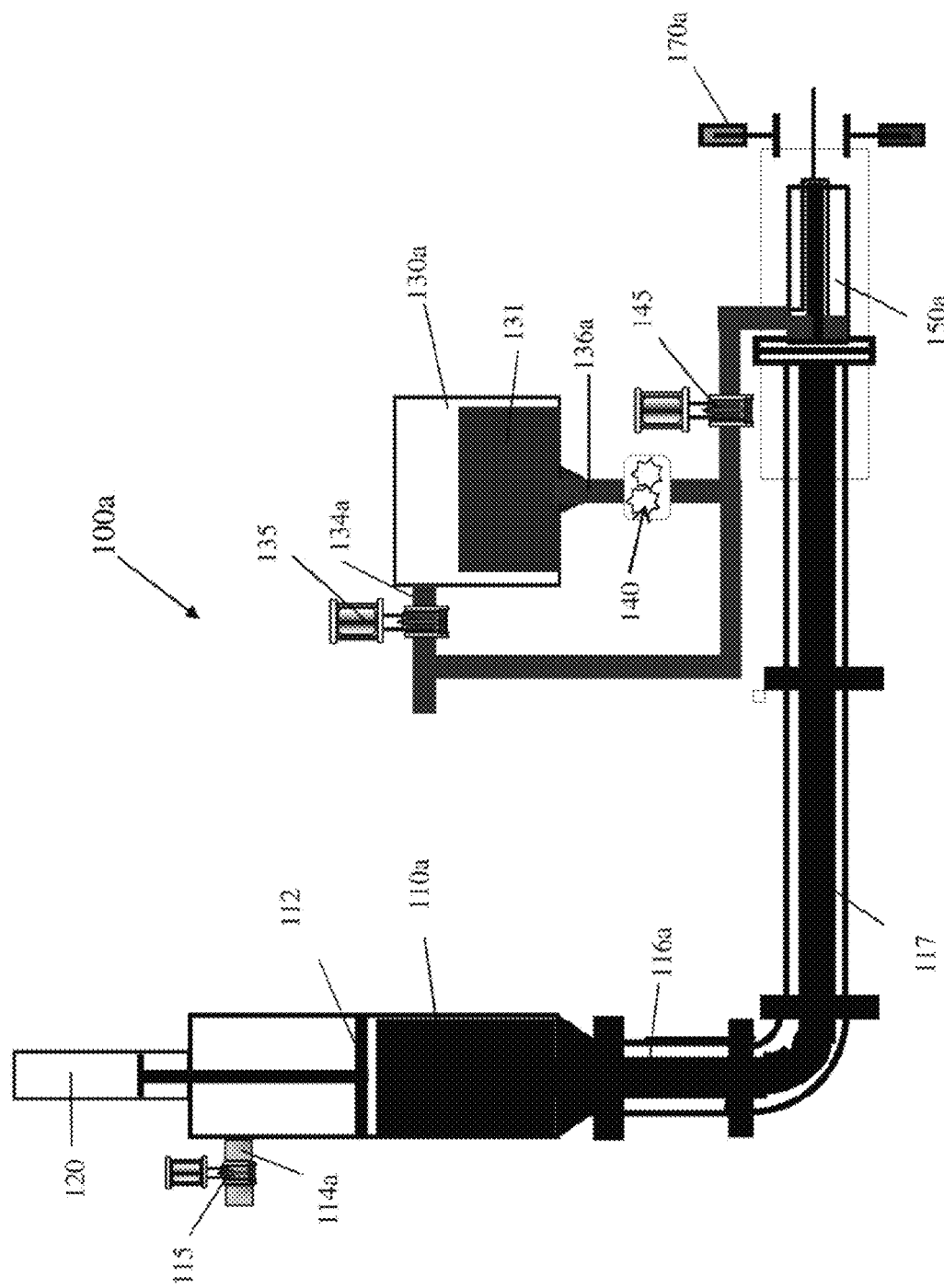

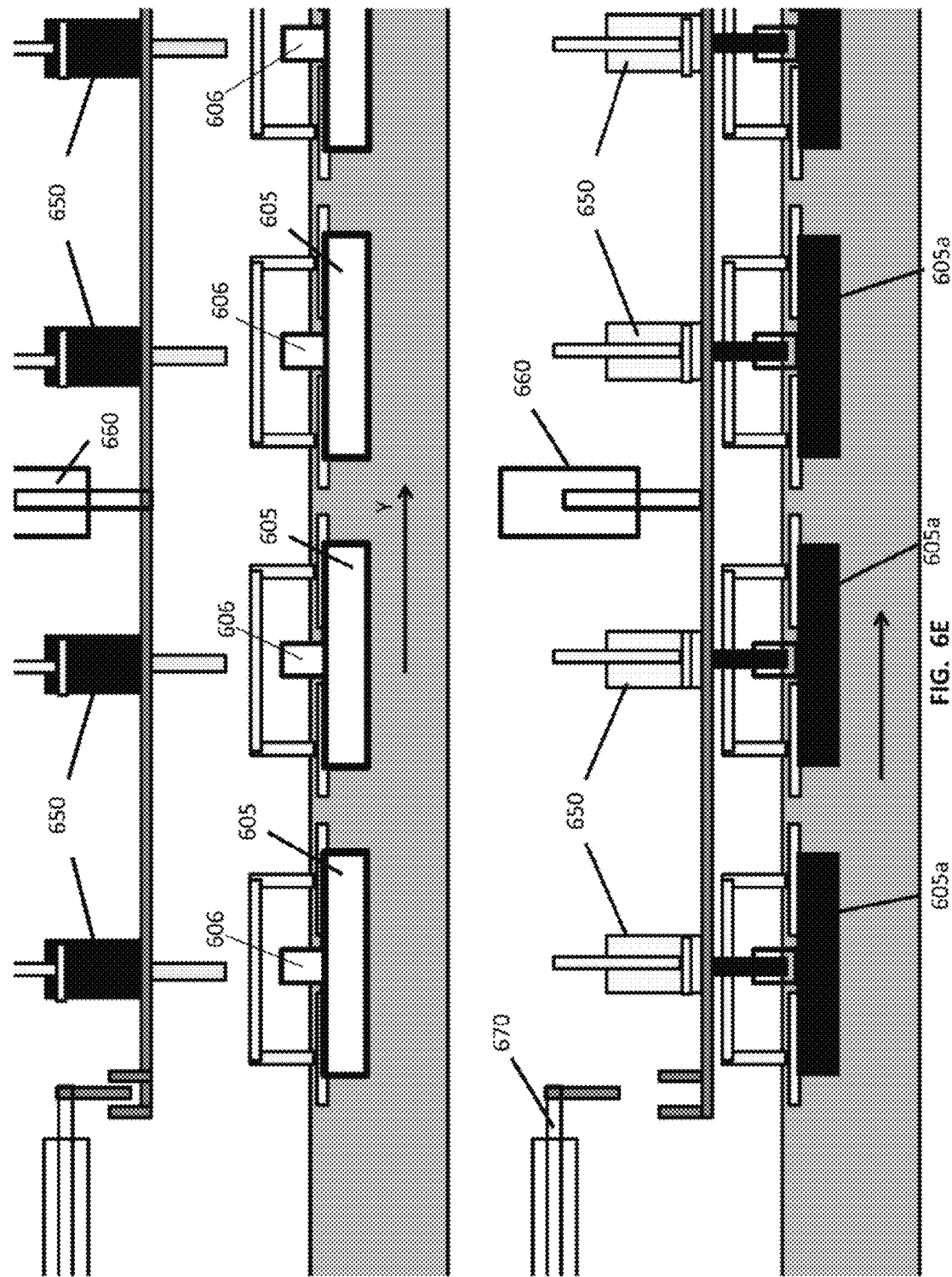

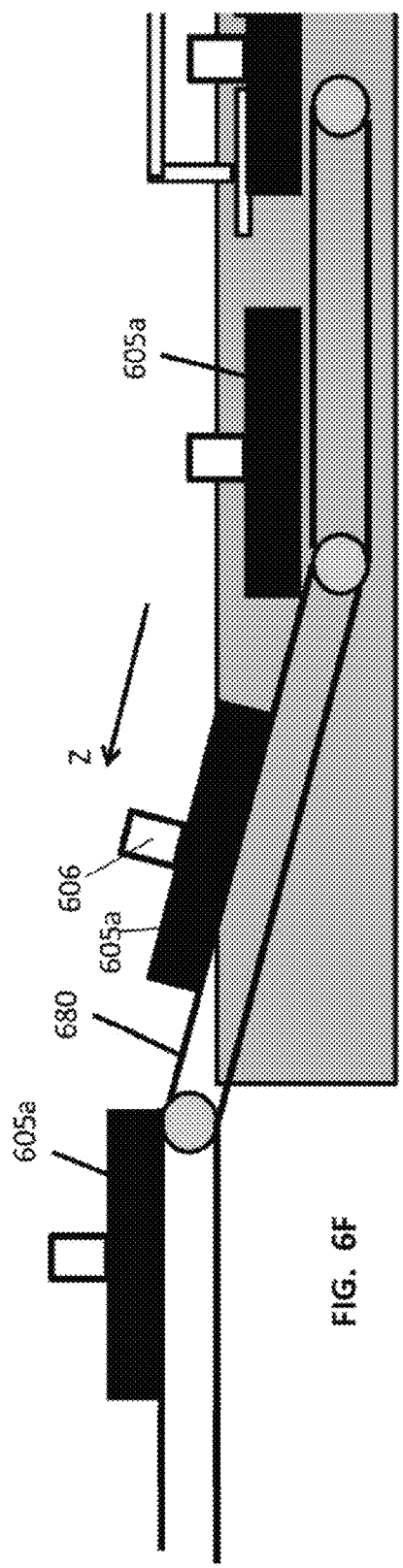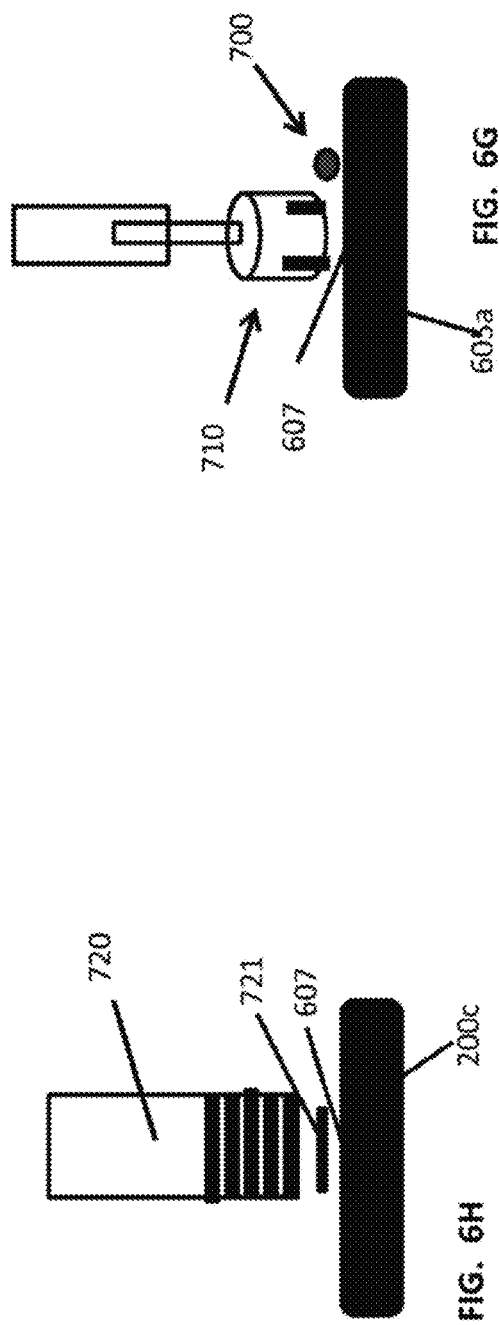

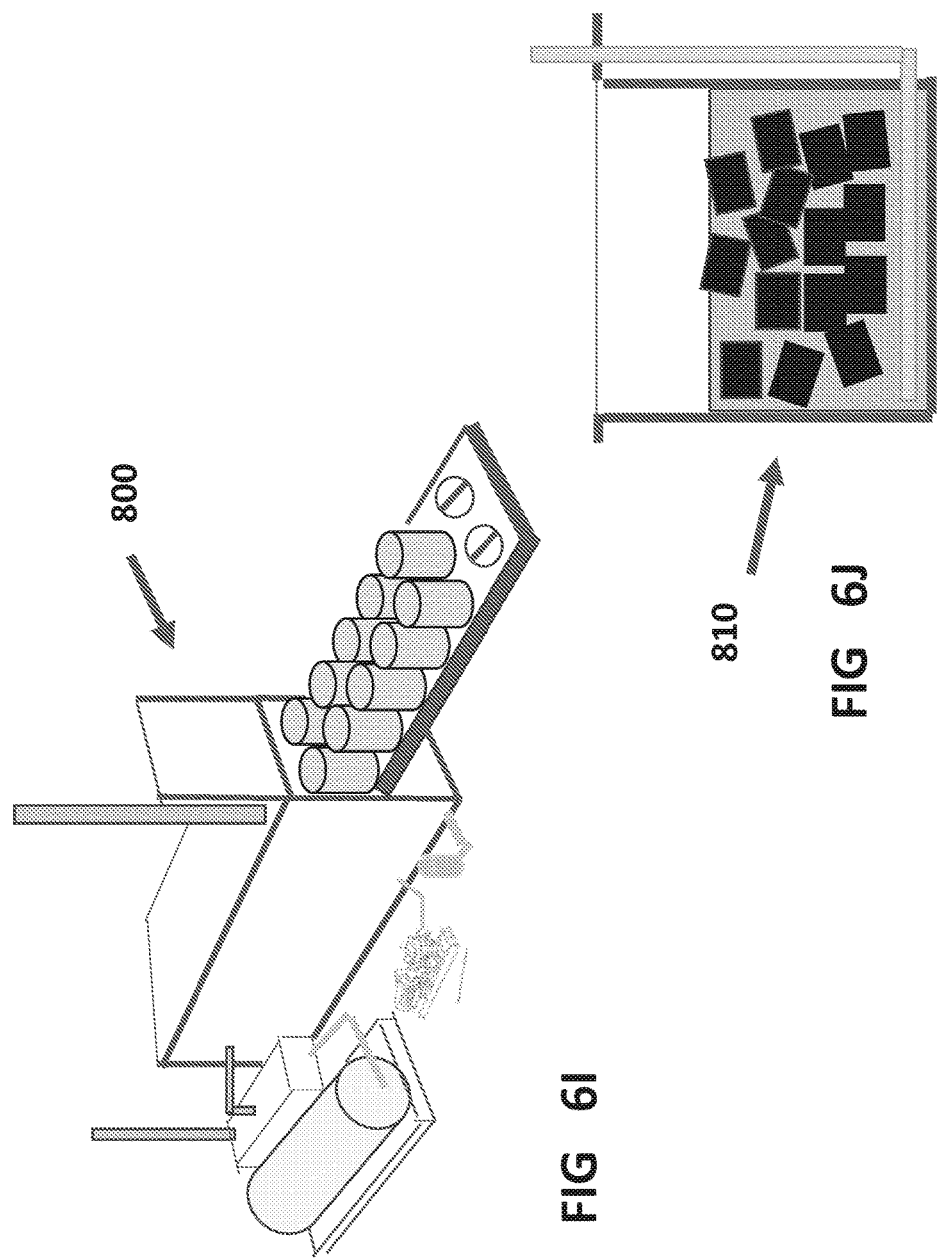

and claims priority to, U.S. patent application Ser. No. 13/984, 030 filed on Oct. 16, 2013, the disclosure of which is herein incorporated in its entirety.
CONSUMABLE BITUMEN BAG FOR PACKAGING BITUMEN AND METHOD OF FORMING THE BITUMEN BAG

RELATED APPLICATIONS

The present invention is a continuation-in-part of, and claims priority to, U.S. patent application Ser. No. 13/984,030 filed on Oct. 16, 2013, the disclosure of which is herein incorporated in its entirety.

FIELD OF INVENTION

The present invention relates to a consumable bitumen bag for packaging bituminous products in cold form and its associated bag forming method. In particular, the invention relates to encapsulating or packing of bitumen with a bitumen bag that is consumable or meltable and miscible with the bitumen content.

BACKGROUND

Bitumen (in some countries is also known as asphalt) is used mainly as a binder in road construction with a small percentage being used in roofing/waterproofing and vibration/anti-corrosion materials. Bitumen, including naturally occurring and refined bitumen obtained from distillation of crude oil, is usually semi-solid at room temperature and liquid when heated up. Conventionally, bitumen is stored and transported in bulk via tanks, pipes, trucks and ships that are maintained at elevated temperature of around 120 to 160° C. (ie. heated form), or at normal ambient temperature in steel drums or in polyethylene, polypropylene or paper bags (ie. cold form).

Storing bitumen in heated tanks and vessels consumes energy, thus making it expensive, whilst storing bitumen cold in drums leads to wastage as bitumen is very viscous and leaves behind residues. For example, the residues in steel drums may amount to about 3%. The top of the steel drum is usually cut open to enable easier decanting, thus leaving a destroyed drum with internal bitumen residue to be disposed of. On the other hand, packing of bituminous products in polyethylene, polypropylene or paper bags often leads to leakages during handling and transporting. Furthermore very often the polyethylene/ polypropylene bags do not melt and integrate into the bitumen but have to be fished out. With greater environmental concern, there is therefore a need for another method of packing, storing and transporting bitumen and bituminous materials in the cold form.

Further, handling and transporting of bituminous products in, for example 200 liters, steel drums can be difficult and hazardous if specialized drum handling equipment is not available at the transporter or end-user site.

US patent publication no. 2007/0027235, by Albert Marchal describes a consumable bitumen packaging material. The packaging material is made of a mouldable composition composed of 60.1-99.9 weight % of polymer, with 0.1-39.9% of the proportion being bitumen, and 0.1-39.9 weight % of a metallic charge. A packing container is moulded and after cooling it is filled with bitumen in a separate operation. The density of the packaging material is adjusted so as to prevent the packaging material from floating to the surface of the molten bitumen. The packaging material also has the required toughness, impact resistance and temperature stability for storage and transport.

Despite development in consumable bitumen packaging, there is still a need for another way of packaging bituminous materials in the cold form yet is clean safe, eco-friendly, energy saving and cost effective.

SUMMARY

The following presents a simplified summary to provide a basic understanding of the present invention. This summary is not an extensive overview of the invention, and is not intended to identify key features of the invention. Rather, it is to present some of the inventive concepts of this invention in a generalised form as a prelude to the detailed description that is to follow.

In this document, bitumen and bituminous materials include the semi-solid hydrocarbon product produced by refining of crude oil, petroleum pitches produced by cracking of petroleum fractions, tar produced from coal and natural occurring bitumen. In North America, asphalt is synonymous to bitumen; outside North America, asphalt refers to a mixture of bitumen and aggregates for road construction.

In one embodiment, the present invention provides a new method for forming a bitumen bag for packaging bitumen in blocks or slabs. Accordingly, the method comprises: melting a bitumen compound containing 10 to 30% by weight of natural bitumen and 5 to 25% by weight of a synthetic rubber polymer; supplying the molten bitumen compound through a plurality of nozzles and coating the molten bitumen compound on a mould skin that is stretched over an expanded mould by rotating the mould and successively building up a thickness of the bitumen compound coating by stepwise translating the expanded mould under the plurality of nozzles; and, once the thickness of the bitumen compound coating is attained to form a bitumen bag, moving the expanded mould into a water bath, reducing the mould volume and withdrawing the mould from the water bath so that the bitumen bag remains in the water bath. In this way, a bitumen bag is produced with a filling port disposed on a top part. After filling the bitumen bag with a bitumen content, the bitumen bag only requires a hot patch seal to close the bitumen bag.

In an embodiment, the method of forming the bitumen bag comprises expanding a volume of the mould by using a gas/air or by a mechanical expandable die means.

In another embodiment, the mould skin comprises a silicon compound, exteriorly coated with a silicon compound or exteriorly coated with a release agent, which includes a petroleum wax or jelly.

BRIEF DESCRIPTION OF THE DRAWINGS

This invention will be described by way of non-limiting embodiments of the present invention, with reference to the accompanying drawings, in which:

FIG. 2B illustrates an end view and FIG. 2C illustrates a sectional view. FIG. 2D illustrates a bitumen block with all sides of the bitumen compound film being sealed up, whilst FIG. 2E illustrates a bitumen block being encapsulated with a bitumen bag formed from the bitumen compound film;

FIG. 3D illustrates a lifting bag containing stacks of bitumen blocks;

FIG. 3E illustrates another lifting bag containing bitumen blocks; and

FIG. 5A illustrates a piston-type bitumen extruder;

FIG. 6E illustrates a method for continuous filling the bitumen bag whilst immersed in cold water;

FIG. 6F illustrates a method for the filled bitumen bag exiting the water bath;

FIG. 6G illustrates removal of the bitumen filling nozzle at a top of the bitumen bag; and FIG. 6H illustrates placement of a hot patch over the filling aperture to complete sealing of the bitumen bag; and FIGS. 6I-6J illustrate two methods of melting the cold bitumen blocks or slabs by the end-users.

One or more specific and alternative embodiments of the present invention will now be described with reference to the attached drawings. It shall be apparent to one skilled in the art, however, that this invention may be practised without such specific details. Some of the details may not be described at length so as not to obscure the invention.

Figure 1A:
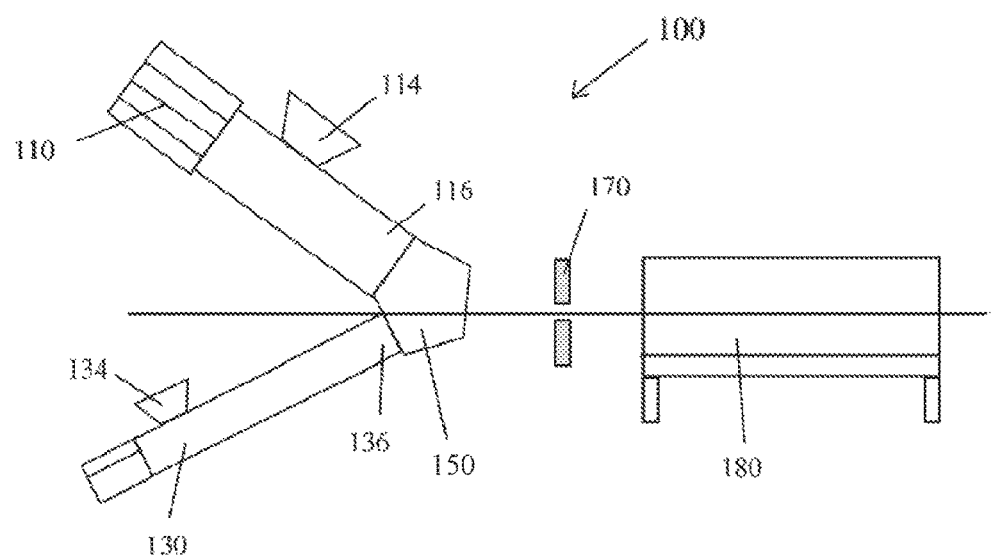
FIG. 1A illustrates a system for extruding bitumen into blocks and encapsulating each block in a bitumen compound film according to an embodiment of the present invention.
Figure 1B:
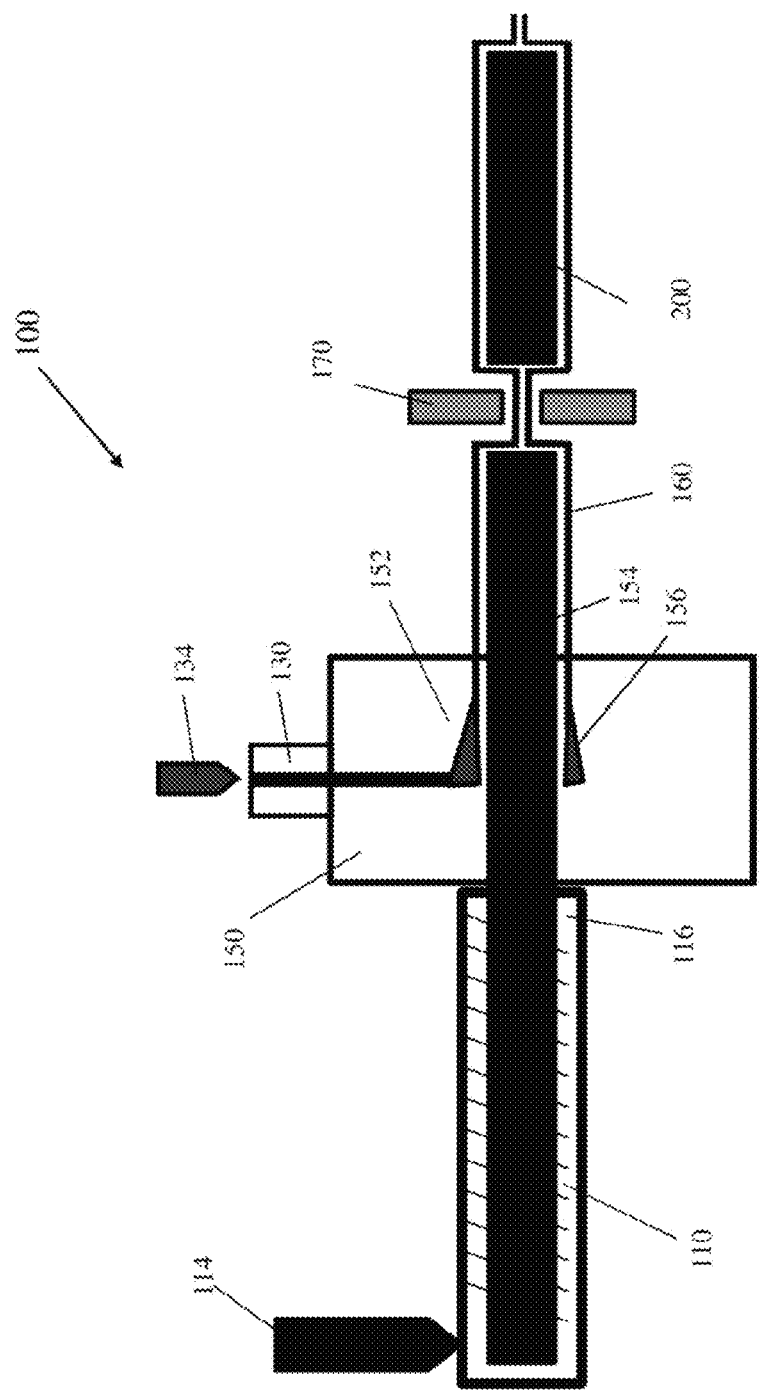
FIG. 1B is a schematic of the system 100 shown in FIG. 1A.

FIG. 1A shows a system 100 for co-extruding bitumen and bitumen compound film according to an embodiment of the present invention, whilst FIG. 1B shows a schematic of the system 100. As shown in FIGS. 1A and 1B, the system 100 includes a bitumen extruder 110, a bitumen compound film extruder 130, an extrusion head 150, a weld press 170 and, optionally, a cooling unit 180. In the system 100, a bitumen product is extruded or dispensed into blocks 200 and each block is encapsulated or encased in a bitumen compound film 160 in one operation.

In one embodiment, the bitumen extruder 110 is a rotary screw extruder. In another embodiment, the bitumen extruder is a piston-type injection extruder. The bitumen extruder 110 has an inlet hopper 114 and an output end 116. Similarly, the bitumen compound film extruder 130 may be a rotary screw or piston-type extruder, which has an inlet hopper 134 and an output end 136. For example, road paving grade bitumen heated to about 140° C. to about 200° C. is fed into the inlet hopper 114 of the bitumen extruder 110, whilst the bitumen compound film 160 composition, heated at about 160° C. to about 200° C., is fed into the inlet hopper 134.

As shown in FIGS. 1A and 1B, the output ends 116, 136 of the bitumen and bitumen compound film extruders are connected to the extrusion head 150 such that bitumen is extruded through a centre core 154 of a die 152 whilst a tube of bitumen compound film 160 is extruded through a channel 156 surrounding the centre core 154. In use, the bitumen compound film 160 is co-extruded to surround a block of extruded bitumen to form a block or slab 200. At the discharge end of the die 152 is a weld press 170 for sealing the bitumen compound film 160 separately at a front end and a rear end of each block of extruded bitumen. Each extruded bitumen block 200 may then be transferred through the cooling unit 180 before the bitumen block 200 is removed for storage or delivery.

In another embodiment of the extruder, be it the bitumen extruder 110 or bitumen compound film extruder 130, the extruder may include a high pressure pump system. The high pressure pump system, for example, in the range from about 10 bar to 200 bar is to provide sufficient force to extrude the bitumen through the centre core 154 of the die 152 or the bitumen compound film 160 through the channel 156 surrounding the centre core 154 of the die 152.

In one embodiment of the present invention, the bitumen compound film 160 is made up of 10-30% by weight of natural bitumen (sometimes known as Gilsonite or asphaltene) and 5-25% by weight of synthetic rubber polymer, and has a melting point of about 100° C. to about 180° C. (Gilsonite is a trade name of American Gilsonite Co., Ltd.). For example, to pack road paving bitumen, such as penetration grades 30 to 100, the bitumen compound film 160 may be made up of 10-30% by weight of natural bitumen, 50-80% by weight of bitumen and 5-25% by weight of synthetic rubber polymer. In another example, to pack polymer modified bitumen (PMB) and roofing/sealing grade bitumen, the bitumen compound film 160 may be made up of 10-30% by weight of natural bitumen and 50-80% by weight of polymer modified bitumen (PMB). In one embodiment, the synthetic rubber polymer and polymer modifier may include styrene-butadiene-styrene (SBS), styrene-butadiene rubber (SBR) and similar rubber grafted polymers and copolymers.

As a reader will appreciate, the bitumen compound film 160 comprises substantially of bitumen. With the core of the bitumen product representing about 75% to about 98% of the total material extruded, the bitumen compound film 160 is fully miscible with a melt of the bitumen block. With natural bitumen, it is now possible to pack bitumen in blocks 200 and the natural bitumen allows the bitumen blocks to be stacked in cold form with less sticking between the bitumen blocks 200. In addition, the relatively small amount of synthetic rubber polymer enhances the properties of the bitumen product without significantly increasing the cost of the packed bitumen blocks 200; for example, when the packed bitumen is used as paving for roads, the bitumen compound film 160 enhances the bitumen by giving it extra durability, resistance to rutting and good gripping surface for tyres. The synthetic rubber polymer in the bitumen compound film 160 also enhances the bitumen by giving it ductility to counter brittleness of natural bitumen.

Figure 3A:
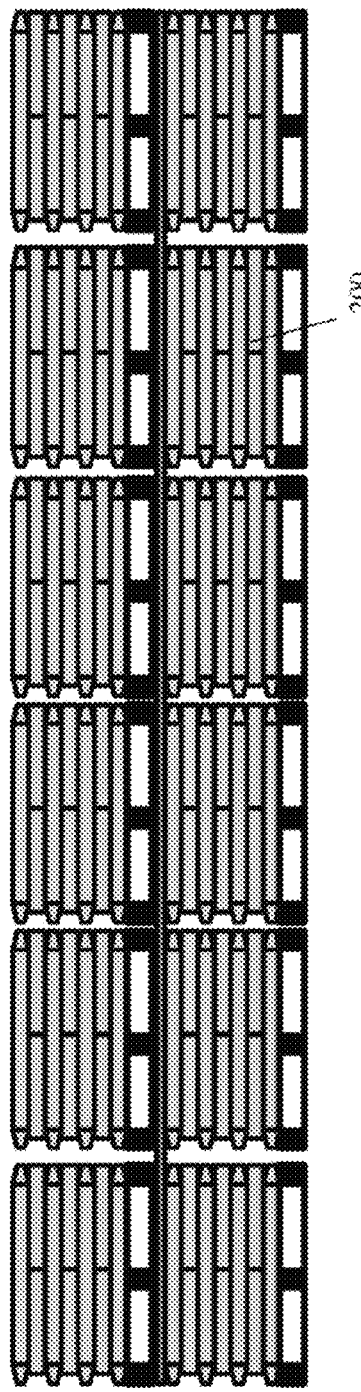
FIG. 3A illustrates pallets with stacks of bitumen blocks shown in FIG. 2A.
Figure 3F:
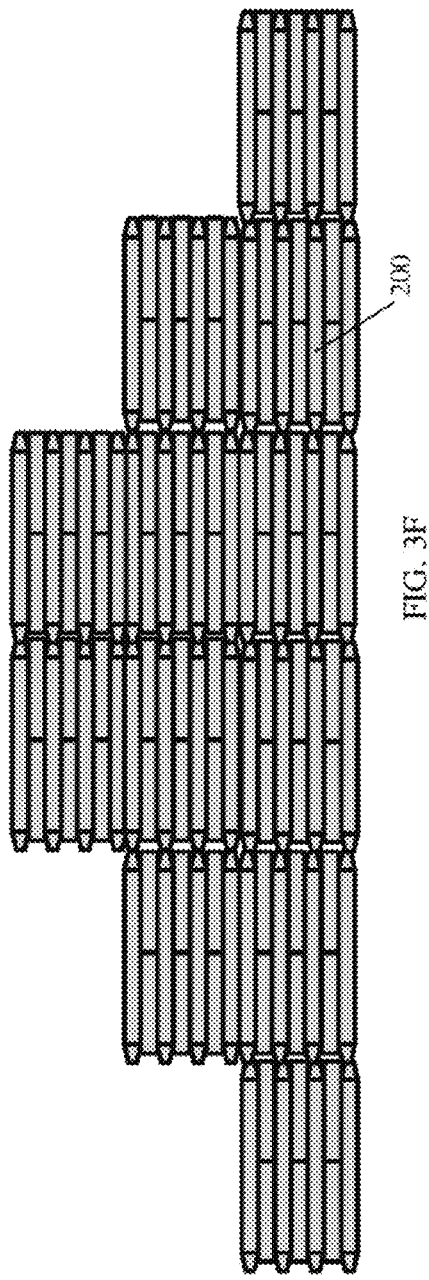
FIG. 3F illustrates stacks of bitumen blocks in storage.
Figure 3B:
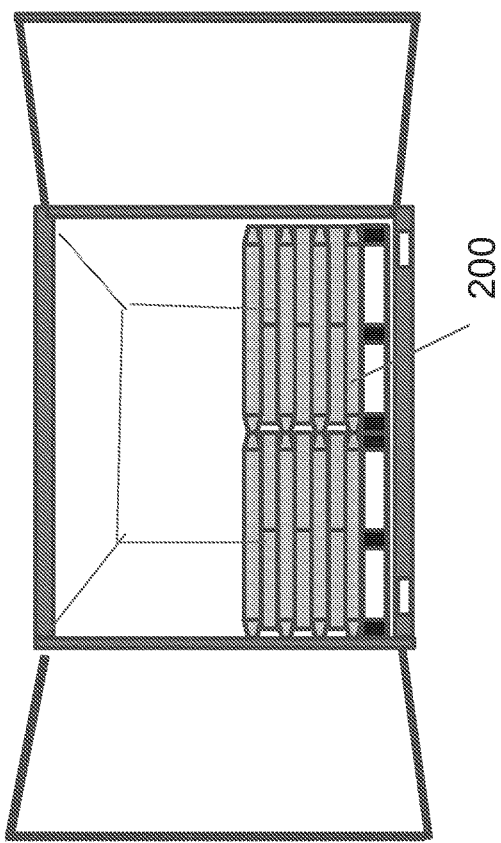
FIG. 3B illustrates a shipping container with pallets of bitumen blocks.
Figure 3C:
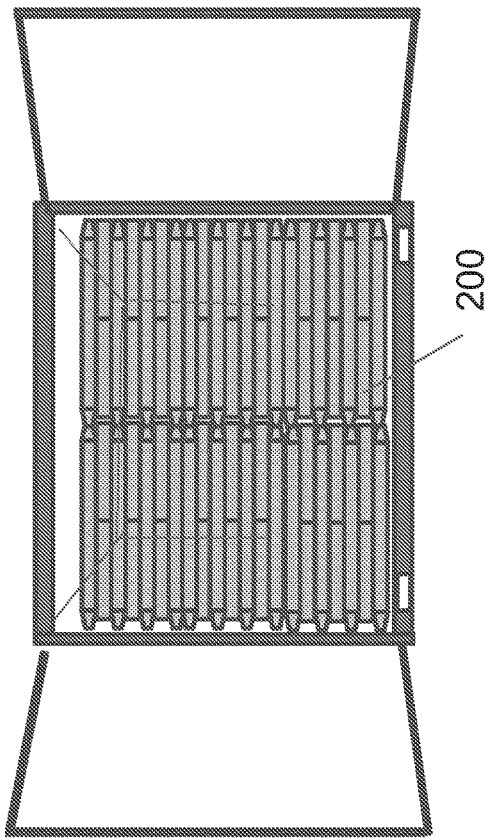
FIG. 3C illustrates a shipping container loaded with bitumen blocks without using pallets.

Preferably, the bitumen blocks 200 are extruded in different sizes and weights. For example, for easy manual handling by a person, a packed bitumen block 200 may range from about 1 kg to about 25 kg, whereas a bitumen block of 25-50 kg may be manageable by two persons. For mechanized handling, a packed bitumen block 200 may range from about 50 kg to about 200 kg. These packed bitumen blocks 200 may be stacked on pallets (as shown in FIG. 3A) and in cartoons for delivery by a lorry or in a shipping container (as shown in FIGS. 3B and 3C) for delivery by road, sea or rail, and so on. These packed bitumen blocks 200 may also be packed in lifting (FIBC) bags (as shown in FIGS. 3D and 3E) for loading into lorries, shipping containers, general dry cargo ships, etc. In storage (as shown in FIG. 3F), powder of calcium carbonate, for example, may be sprinkled on surfaces of the packed bitumen blocks 200 to further minimize or prevent them from sticking to adjacent packed bitumen blocks. In another alternative, sheets of paper or plastics are used between the packed bitumen blocks to further minimize the bitumen blocks from sticking to each other.

Figure 2A:
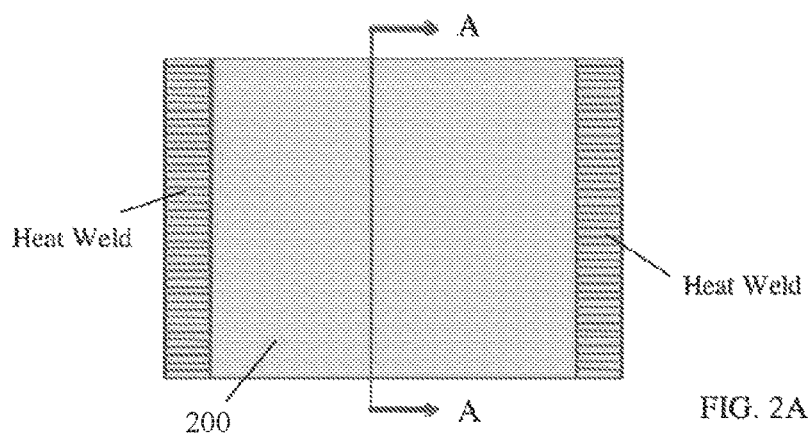
FIG. 2A illustrates a bitumen block according to another embodiment of the present invention, whilst
Figure 2B:
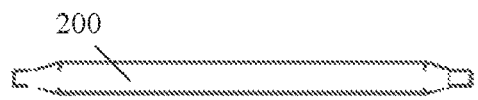

In one embodiment, each pack of bitumen block 200 is formed into a slab 200a. Preferably, the packed bitumen slab 200a has length, width and thickness dimensions, in which the width/length to thickness aspect ratio is about two times or more. FIG. 2A shows a packed bitumen block or slab 200,200a after it is formed by the co-extrusion system 100. These blocks or slabs 200,200a of bitumen, therefore, has a large surface area to volume ratio and thus allows a packed bitumen slab 200a to melt quickly when heated up in a cauldron. In addition, the cauldron of molten bitumen, obtained by melting many of these packed bitumen blocks or slabs 200, 200a, is homogenous and therefore any required agitation/mixing is minimal. In contrast, the melt down with conventional polyethylene and polypropylene bags results in these synthetic polymers floating on the surface of the molten bitumen and it is difficult to disperse these synthetic polymers into the molten bitumen.

Depending on the grade of bitumen to be packed and size of each bitumen block 200, 200a, the bitumen compound film 160 may range from a thickness of about 200 microns to about 5 mm. For example, for a 5-kg block of 60-70 or 80-100 penetration grade bitumen, a bitumen compound film 160 thickness of about 200 microns is found to be sufficient; for a 200-kg block of similar grade of bitumen, the thickness of the bitumen compound film 160 is about 5 mm.

Figure 4:
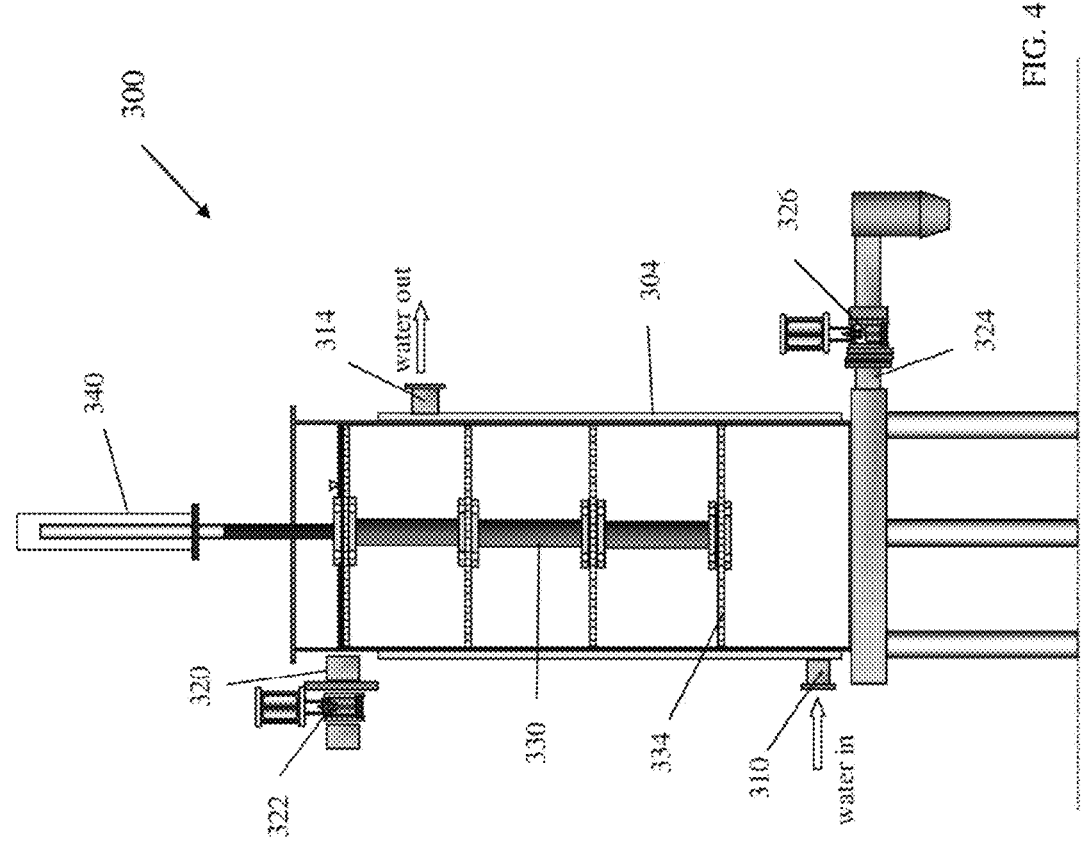
FIG. 4 illustrates a mixing and cooling tank for supplying bitumen to the bitumen extruder shown in FIG. 1A.

FIG. 4 shows a bitumen mixing and cooling tank 300 for use with the above bitumen extruder 110. As shown in FIG. 4, the mixing and cooling tank 300 includes a double walled, upright vessel. Cooling water is supplied to an outer jacket 304 via a water inlet 310 located near the bottom of the tank 300 and exits through a water outlet 314 located near the top of the tank. Near the top of the tank 300 and above the outer jacket 304, a bitumen inlet 320 allows hot, flowable bitumen to enter the core of the tank 300. Connected to the bitumen inlet is a valve 322, such as a gate valve. Inside the core of the tank, there is a ram 330 with multi-pistons 334. The ram 330 and pistons 334 are operated to oscillate within the interior of the tank 300 to agitate the bituminous content in the tank to increase heat transfer to the cooling water. Oscillation of the ram-pistons is actuated by a driver 340, such as a fluid cylinder. Near the bottom of the tank, the bituminous content of the tank has cooled down and is discharged through a bitumen outlet 324. Connected to the bitumen outlet 324 is an outlet valve 326, such as a gate valve. Discharge of the cooled bitumen may be carried out by synchronising the opening the bitumen outlet valve 326 and the pushing of the ram and pistons. Alternatively, a pump may be supplied after the bitumen outlet valve 326. The cooled bitumen is then supplied to the bitumen extruder 110.

Depending on the bitumen product, the bituminous product is fed into the mixing and cooling tank 300 at a temperature of up to about 180° C. and the cooled bitumen is supplied to the extruder 110 at a temperature as low as about 40° C.

FIG. 5A shows a system 100a for co-extruding bitumen and bitumen compound film 160 according to another embodiment of the present invention. As shown in FIG. 5A, the system 100a includes a piston-type extruder 110a and a bitumen compound film extruder 130a being connected to an extrusion head 150a. The piston-type extruder 110a has an internal chamber in which a piston 112 is operated to translate to and fro. Bituminous product from the mixing and cooling tank 300 is fed into the piston-type extruder 110a via an inlet 114a. Before the inlet 114a, an inlet valve 115 is connected thereto. The piston 112 is operated by an actuator 120, such as a fluid cylinder. As shown in FIG. 5A, the outlet 116a of the extruder is joined by a forming and cooling barrel 117 to the core 154 of the extrusion die 152 disposed in the extrusion head 150a.

Referring again to FIG. 5A, the bitumen compound film 160 extruder 130a has a barrel 131 to contain the bitumen compound. The bitumen compound is pumped or poured into the barrel 131 through an inlet 134a, for example, via a gate valve 135. At the outlet 136a from the barrel 131, there is a gear pump 140. The gear pump 140 is operated to supply the bitumen compound at a pressure of up to 200 bar to the channel 156 of the die 152 to form the bitumen compound film 160. Between the gear pump 140 and the extrusion head 150a is a control valve 145. As shown in FIG. 5A, the outlet at the gear pump 140 branches out at a point between the gear pump 140 and control valve 145 to the inlet 134a. When the control valve 145 is shut, the gear pump recirculates the bitumen compound back into the barrel 131.

Figure 5B:
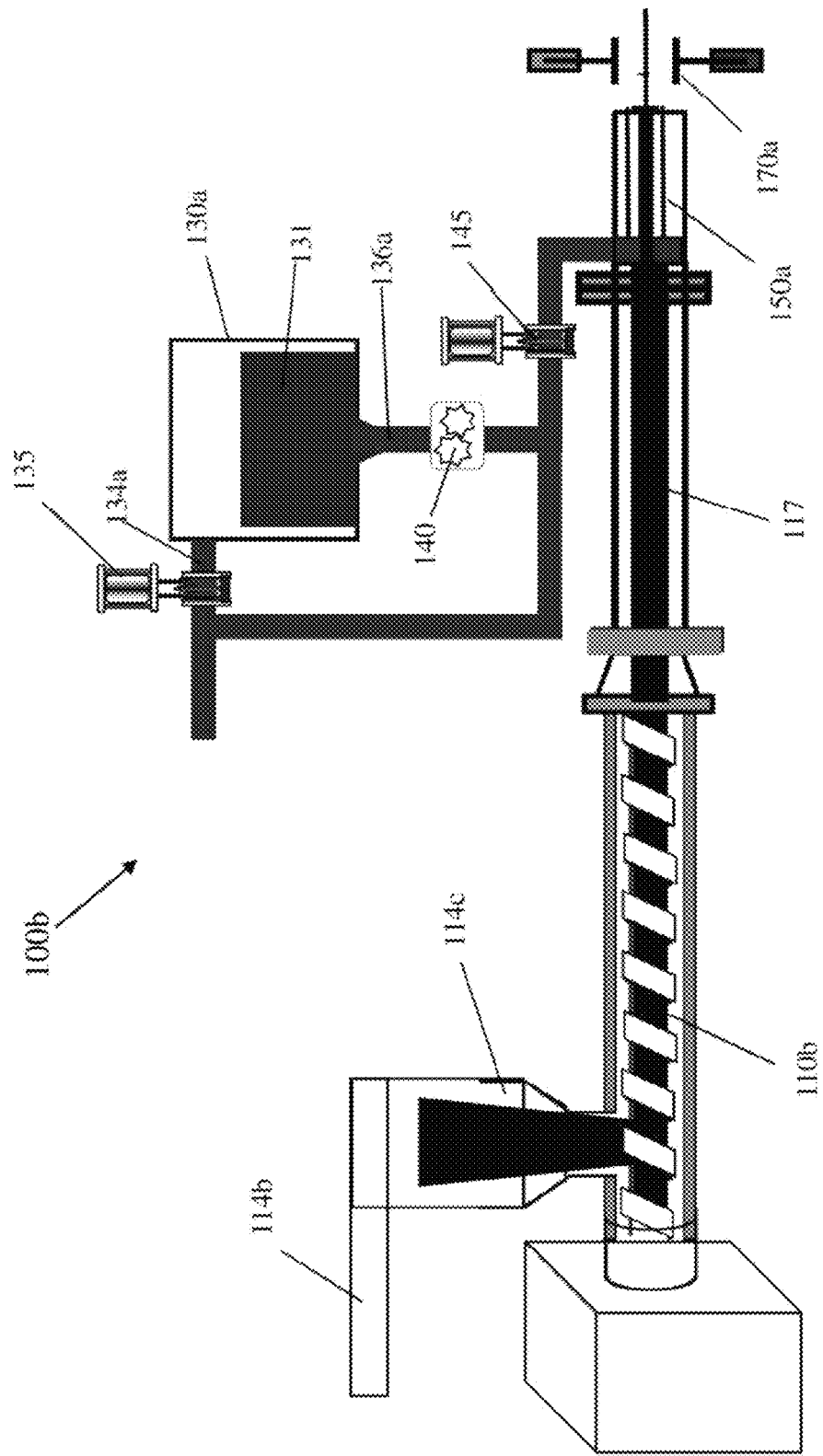
FIG. 5B illustrates a screw-type bitumen extruder.

FIG. 5B shows a system 100b for co-extruding bitumen and bitumen compound film 160 according to yet another embodiment of the present invention. As shown in FIG. 5B, the system 100b is similar to the previous system 100a except that the extruder 110b is a screw-type extruder; at the inlet 114b to the screw-type extruder, the pressure of the bitumen product is controlled by a pressure regulator 114c.

Figure 5C:
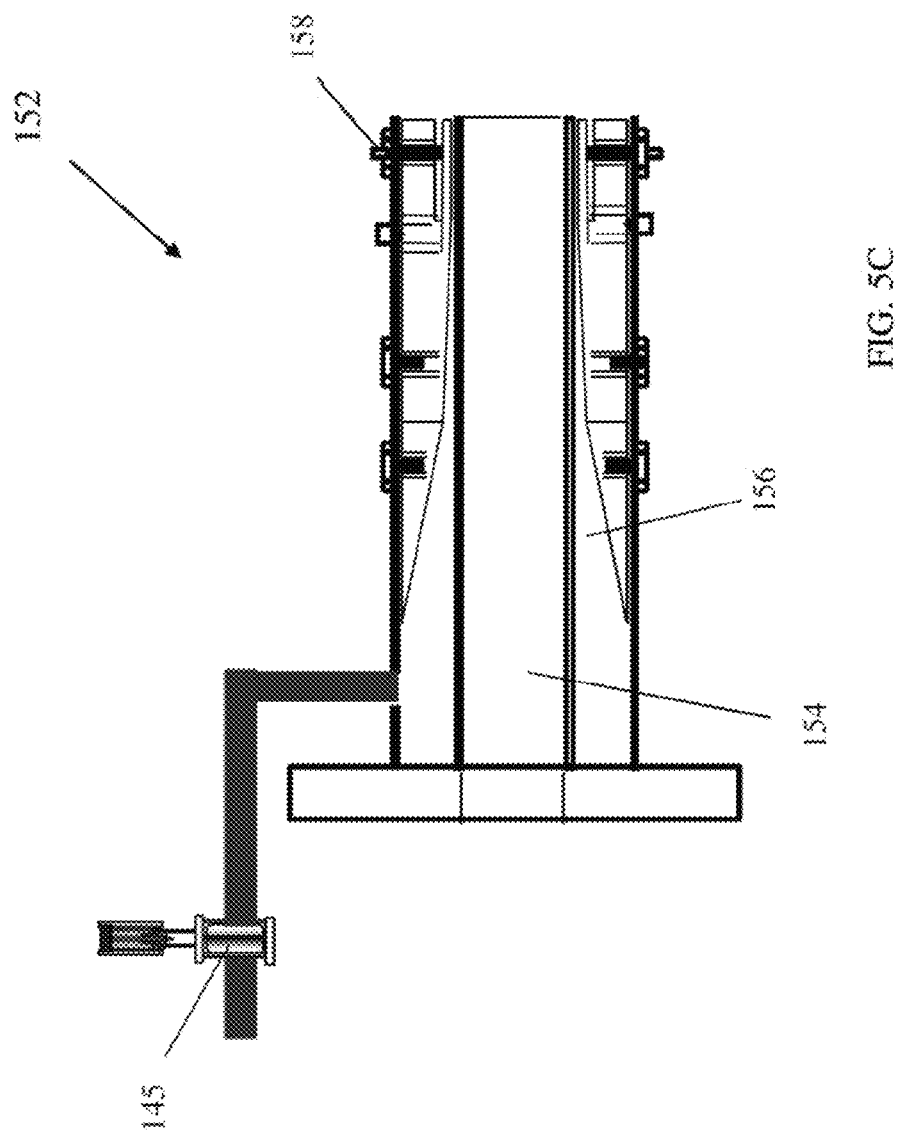
FIG. 5C shows a sectional view of the extrusion head for use with the piston-type and/or screw-type bitumen extruder.

FIG. 5C shows a section view of an extrusion head 150,150a. As shown in FIG. 5C, the core 154 of the extrusion die 152 is disposed at the centre of the die while the channel 156 surrounds the core 154. As can be seen in FIG. 5C, the outlet opening of the channel 156 is adjustable, for example from about 200 micron to about 5 mm by a set of adjustment screws 158.

Figure 6A:
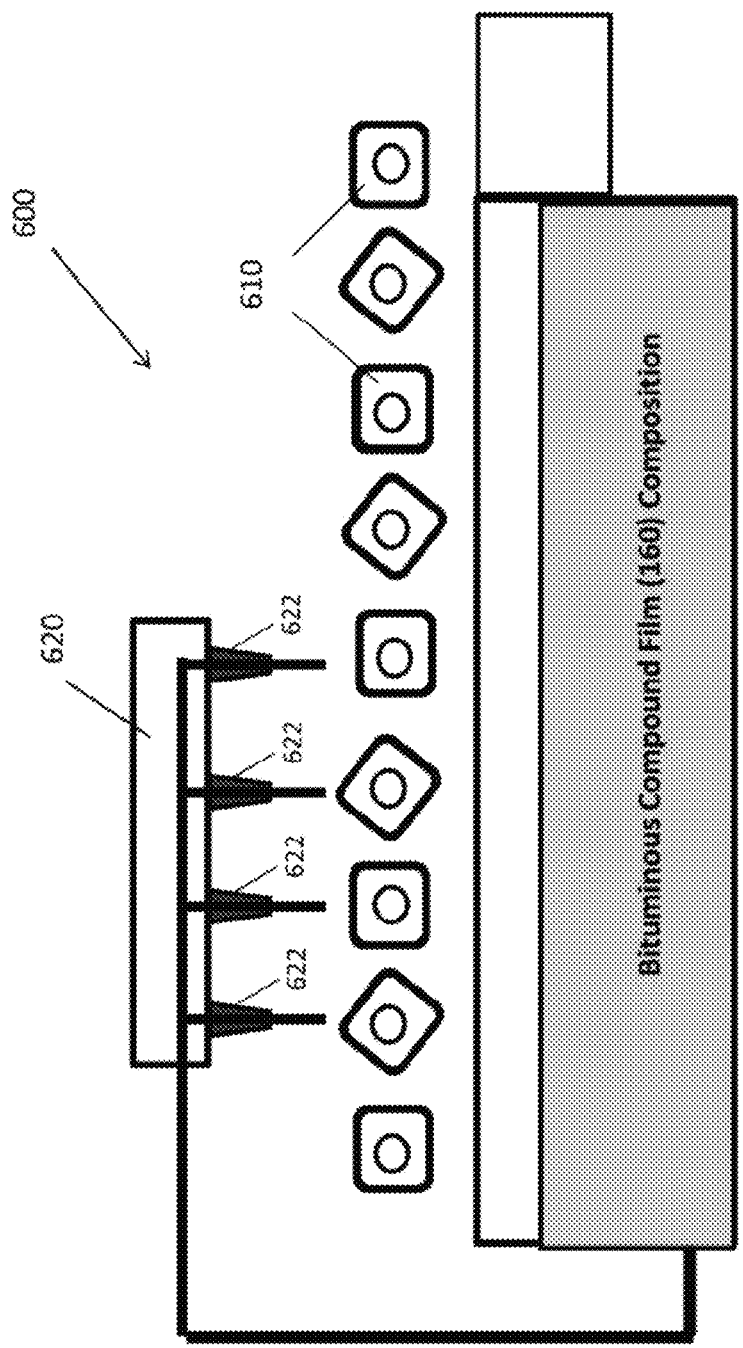
FIGS. 6A-6C illustrate a pneumatic method of forming the bitumen bag shown in FIG. 2E, whilst
Figure 6B:
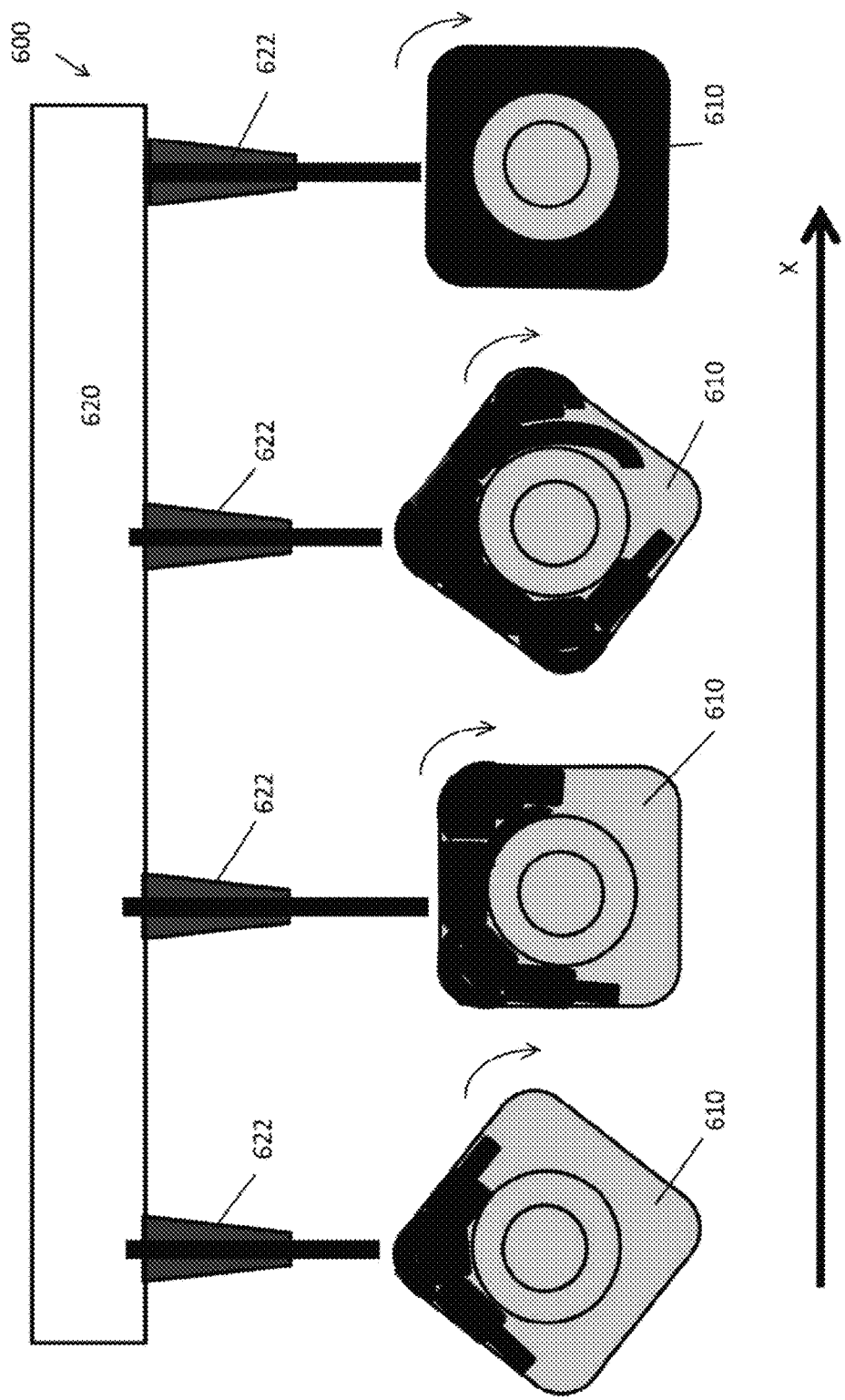
Figure 6C:
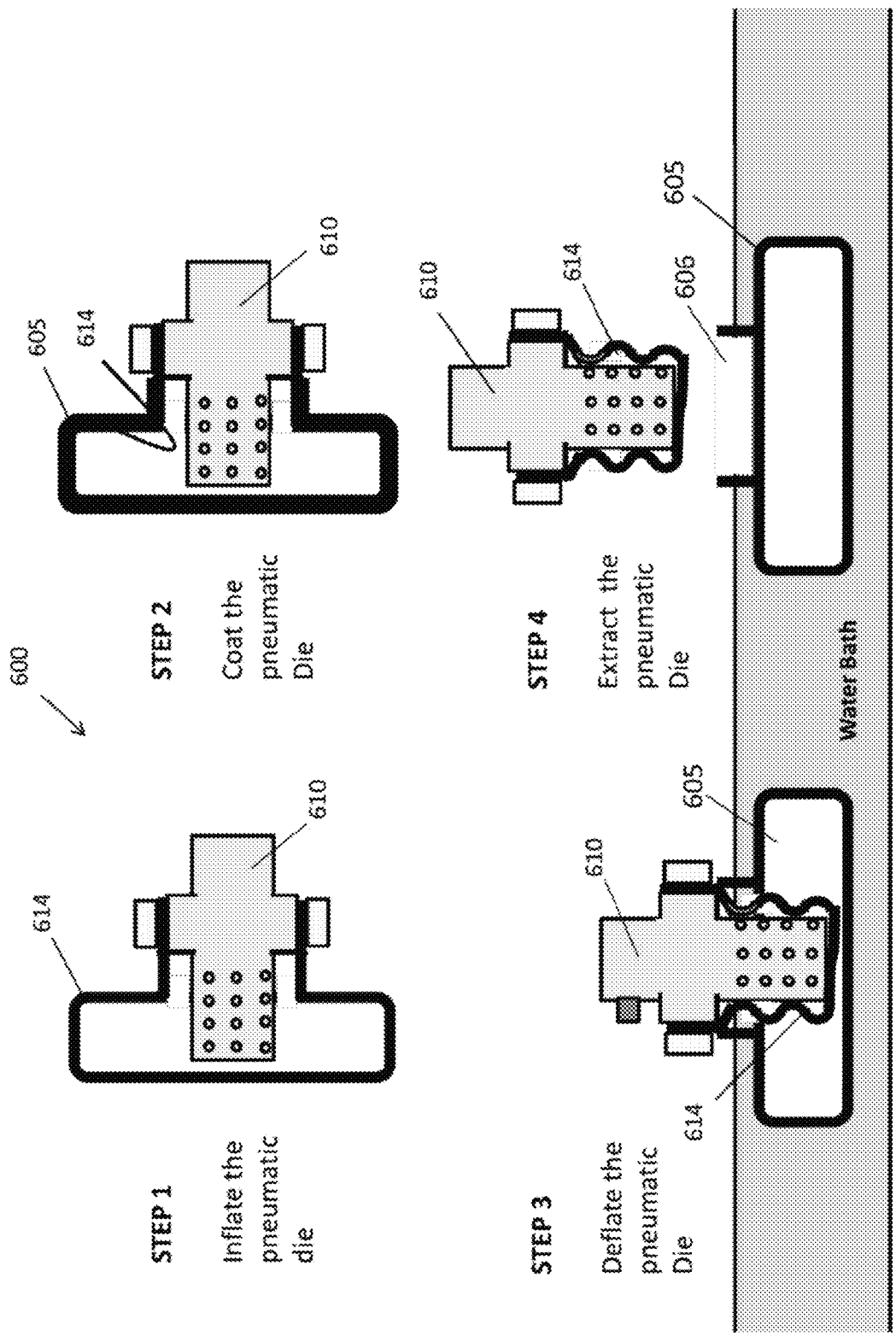
Figure 6D:
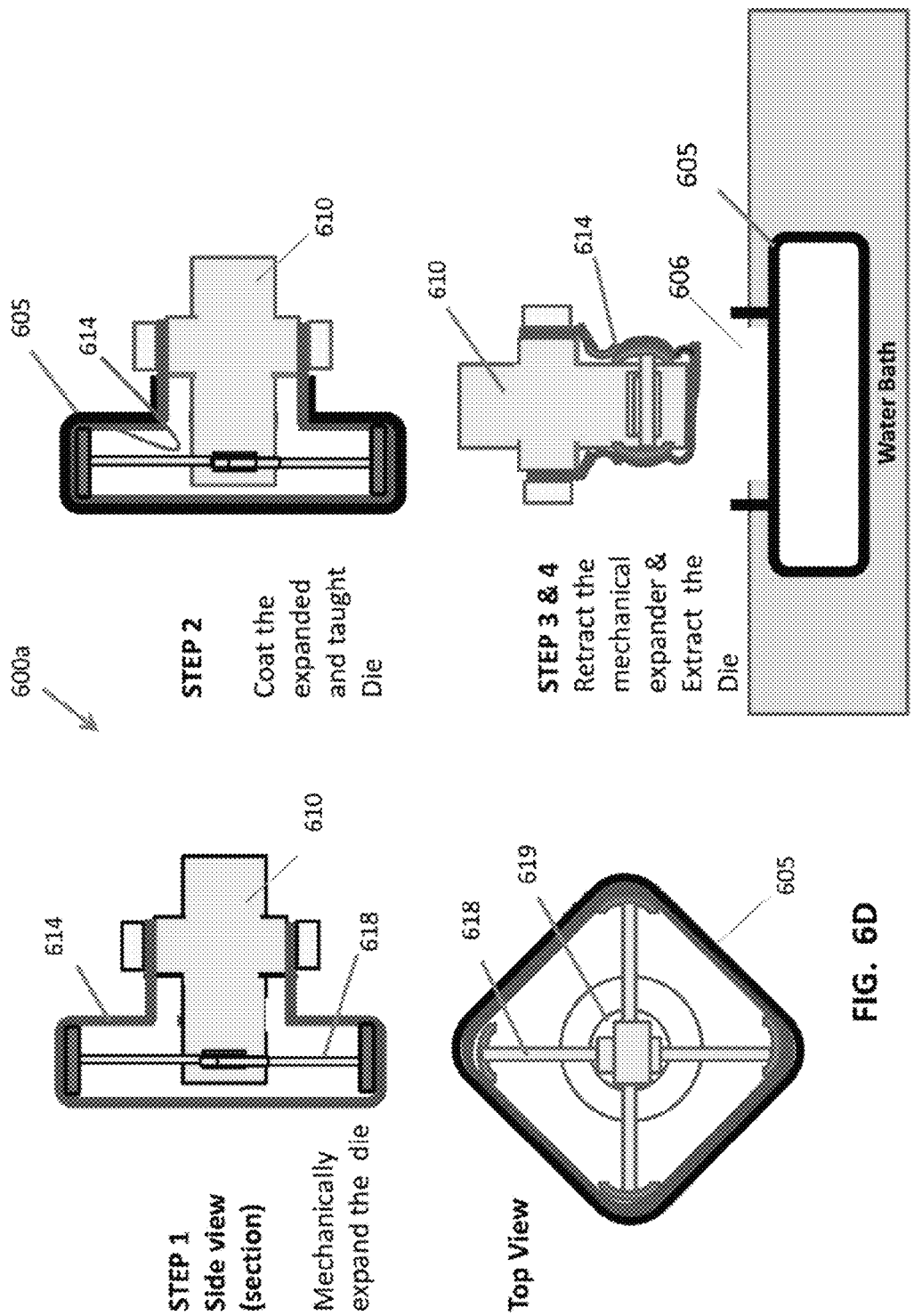
FIG. 6D illustrates a mechanical method of forming the bitumen bag according to yet another embodiment.

In packing the above bitumen block 200, 200a, 200b, the compound film 160 is sealed at two or four edges. FIGS. 6A-6C show a method 600 for forming the bitumen compound film 160 into a bitumen bag 605, whilst FIG. 6D shows another method 600a. The bitumen bag 605 formed with these methods requires only a single heat seal patch on a top surface of the bitumen bag 605 for sealing the filling aperture, thus, reducing the risk of leaking bitumen encased in the bitumen bag 605. FIG. 6A shows a plurality of moulds 610 and an extrusion head 620 with a plurality of nozzles 622. The nozzles 622 are spaced apart according to a pitch spacing of the moulds 610. In one embodiment, the bitumen compound film 160 composition is exuded through the nozzles 622 and arranged to fall by gravity onto the associated moulds 610. At the same time, the moulds 610 are rotated at a predetermined speed, so that the bitumen compound film 160 composition builds up a coat over the mould 610. The moulds are also translated periodically in the direction of arrow X relative to the nozzles, so that after the molding method 600 is complete, the bitumen compound film 160 builds up to a predetermined thickness as required for each type of mould and designed capacity to form the bitumen bag 605. As an example, FIG. 6B shows four moulds 610 are used, but this method 600 is not so restricted by the number of moulds. FIG. 6C shows four steps involved in the method 600 for forming the bitumen bag 605; in step 1, an inflatable mould skin 614 made of a silicone compound, exteriorly impregnated with a silicone compound or exteriorly coated with a release agent (such as, petroleum wax or jelly), is inflated by supplying a gas/air into each mould 610. The inflated mould skin 614 takes on a predetermined shape and dimensions and, in step 2, the exterior of the inflated mould skin 614 is coated with a film of the bitumen compound 160. After the bitumen compound film 160 has built up to the desired thickness, each mould 610 is moved into a water bath, in step 3; after the bitumen compound film 160 is cooled down and hardened sufficiently, the gas/air supply to the associated mould 610 is then released or reversed. By releasing or reversing the gas/air supply, the inflatable mould skin 614 becomes separated from the bitumen compound film 160. Reversing the gas/air supply may involve gradual vacuuming the interior of the mould, at least momentarily. In step 4, the mould and deflated mould skin 614 is withdrawn from the water bath to leave a moulded bitumen compound film 160, now formed into the bitumen bag 605. Each bitumen bag 605 can then be subsequently filled with bitumen but requires only one filling aperture 607 at a top of the bitumen bag. With only one hot bitumen patch 721 for sealing the filling aperture 607, a pack of bitumen block 200c obtained by this method 600 has reduced risk of leaking bitumen; preferably, in use, the bitumen sealing patch 721 is arranged on an upper surface of each pack of the bitumen block 200c.

In FIG. 6C, expansion of the inflatable mould skin 614 is done by a pneumatic means. Alternatively, in method 600a, as shown in FIG. 6D, expansion of the inflatable mould skin 614 is carried out by mechanically expanding a die 618. The die 618, may include four extendable arms 619, each being extendable in a coordinated manner by means of a fluid piston-cylinder means, a motor means, and so on. The steps for forming the bitumen compound bag shown in FIG. 6D are similar to those described above. An advantage of the method 600, 600a over the above co-extrusion embodiments is that the bitumen compound film 160 need not be cooled down before carrying out the method of forming the bitumen bag 605. With the method 600, 600a, the bitumen compound bags 605 are formed by successive coating as the moulds 610 are rotated and are cooled down during the forming process; in other words, the bitumen compound film 160 composition used in the method 600, 600a can be supplied at a higher temperature than for the above co-extrusion method. Another advantage of the method 600, 600a is that the bitumen bags 605 can be preformed at a facility remote from the bitumen filling and packing facility, as compared to the above co-extrusion systems.

In FIG. 6E, at a filling station, filling of the bitumen bag 605 takes place whilst the bitumen bag is still immersed in the water bath to protect the integrity of the bitumen bag when hot bitumen is introduced. A gang comprising multiple dispensers 650, each with a fixed or predetermined quantity of bitumen to dispense, is lowered by means of pneumatic/hydraulic actuator 660 so that each fill nozzle 655 enters the associated bitumen bag 605 through a filling port 606. The filling dispensers 650 travel with the bitumen bags 605, which are moved slowly by a conveyor. (The conveyor is more clearly shown in FIG. 6F). After the bitumen filling has taken place, the filling dispensers 650 are retracted and returned rapidly to a start point by means of a linear actuator 670 (for eg. pneumatically or hydraulically) depending on the stroke of translation of the linear actuator. From the start point, the bitumen filling cycle is re-started as newly formed bitumen bags 605 are conveyed into the filling station.

In FIG. 6F, when the filled bitumen bags 605a reach the end of the cooling bath by which time they have reached ambient temperature, the filled bitumen bags 605a exit the water bath by way of partially submerged inclined conveyor 680. Once out of the water, each bitumen bag filling port 606 is cut off by a hot wire cutter 700 (as seen in FIG. 6G), leaving a filling aperture 607 at a top of the filled bitumen bag. The material of the filling port 606 is then removed by a vacuum head 710 (which in addition to removing the material) dries an area around the filling aperture 607. Each filled bitumen bag 605a is moved under a hot patch sealing dispenser 720 to apply a patch seal 721 over the filling aperture 607 (as seen in FIG. 6H), thus finalizing the bitumen filling process and producing a packed bitumen block 200c with bitumen being encapsulated in the bitumen bag.

In FIGS. 6I-6J, at the end-user site, the packed bitumen blocks 200,200a, 200b,200c are heated to a temperature of about 150° C. to about 200° C. to melt both the bitumen and the bitumen compound film 160. This is achieved by utilizing any of the known drum decanting heaters 800 and/or heated bitumen tanks 810.

An advantage of the present invention is that the bitumen compound film 160 composition is totally compatible and miscible with a melt of the bitumen product. The composition of the bitumen compound film 160 goes into the bitumen content and there is no residue, material wastage or environmental waste. In addition, the natural bitumen and the synthetic rubber polymers/copolymers composed in the bitumen compound film 160 enhance the physical properties of the bitumen, possibly due to the high molecular mass and long chain polymers of the natural bitumen creating cross-links in the resultant molten bitumen. For example, the composition of the bitumen compound film 160 may increase the softening temperature of the bitumen mix; bitumen with a higher softening point is advantageous because of its reduced rutting on road surfaces, especially in regions of hot climates. Also, the natural bitumen gives the bitumen compound film 160 less stickiness, thus minimizing sticking of stacked bitumen blocks 200, 200a, 200b, 200c. To further minimise sticking of the bitumen blocks, industrial talcum powder is sprinkled on the bitumen blocks.

The methods of dispensing and packing bitumen according to the present invention are also safer than conventional methods. For example, these methods of dispensing and packaging bitumen pose a lesser occupational hazard to an operator as it is an automated process with the hot product immersed in water until the packed bitumen blocks are cooled to the ambient temperature. The most common existing conventional method is by way of filling bitumen in steel drums which is often a manual operation and the hot drums, at 120-160 deg C. are always left to cool making them a serious safety hazard.

The other advantage according to the present invention is that dispensing of the bituminous product and encapsulating it in a bitumen compound film is a continuous process (not a batch process). In contrast, the conventional filling of bitumen products in drums, polyethylene, polypropylene or paper bags involve several steps and these lead to unnecessary multiple handling. Hence, the present methods are faster and operable at a higher volume than convention methods. This method of dispensing and packing bitumen according to the present invention is, therefore, superior, more economical and energy saving than known methods.

The methods of dispensing and packing bitumen according to the present invention give a very positive financial advantage over conventional methods. When the bitumen packs 200, 200a, 200b, 200c are melted for use, the bituminous compound film 160 becomes part of the finished product. Thereby, the cost of the packing material is reimbursed.

The methods of dispensing and packing bitumen according to the present invention utilizing the consumable bitumen bag which is dissolved in the bitumen results in zero waste, thereby making this process an environmentally superior method of packing bitumen in cold form.

The methods of dispensing and packing bitumen according to the present invention makes the maximum use of facilities in as much that the finished products come off the production line and are loaded into shipping containers or trucks, thus greatly minimizing the land area required for a consumable bitumen packing plant. With conventional bitumen packing system the finished products must be left to cool for at least 24 hours before they can be packed for dispatch, thereby necessitating large land/warehouse areas.

While specific embodiments have been described and illustrated, it is understood that many changes, modifications, variations and combinations thereof could be made to the present invention without departing from the scope of the present invention. Whilst the bitumen blocks 200,200a, 200b,200c are described broadly to contain paving, roofing and waterproofing materials, the bitumen products are not so limited but include other bituminous compounds, such as: tars; pitches obtained from bottom residues of petroleum refineries; asphalts; industrial bitumen; and bitumen emulsions. In the above description, the bitumen blocks/slabs 200,200a,200b,200c and bitumen compound film 160 are co-extruded; it is possible that the bitumen product is dispensed into moulds, allowed to cast into shape and cooled down before each bitumen block or slab is encased by the above bitumen compound film 160. It is also possible that the above bitumen compound film 160 is extruded into separate sheets; for example, two sheets of bitumen compound films 160 are extruded to cover a bitumen block/slab and all the edges of the bitumen compound film are heat sealed to encase the bitumen block/slab 200b, as shown in FIG. 2D. It is also possible to coat each bitumen block with the above bitumen compound film, for example, by dipping or spraying. In another example, a pair of weld presses 170 may be used to simultaneously heat seal the front and rear edges of a packed bitumen block; it is also possible to employ a weld press to simultaneously heat seal all the edges of a packed bitumen block in one operation.

The invention claimed is:

1. A method for forming a bitumen bag comprising:
   melting a bitumen compound containing 10 to 30% by weight of natural bitumen and 5 to 25% by weight of a synthetic rubber polymer;
   supplying the molten bitumen compound through a plurality of nozzles and coating the molten bitumen compound on a mould skin that is formed over an expanded mould by rotating the mould and successively building up a thickness of the bitumen coating by stepwise translating the expanded mould under the plurality of nozzles; and
   once the thickness of the bitumen coating is attained to form a bitumen bag, moving the expanded mould into a water bath, reducing the mould volume and withdrawing the mould from the bitumen bag whilst the bitumen bag remains in the water bath, thereby forming a bitumen bag with a filling port disposed at a top part.

2. The method according to claim 1, wherein the mould volume is expanded by inflating a gas/air into the mould.

3. The method according to claim 1, wherein the mould volume is expanded by a mechanical means.

4. The method according to claim 3, wherein the mould comprises four expandable arms.

5. The method according to claim 1, wherein the mould skin is made of a silicone compound.

6. The method according to claim 1, wherein an exterior surface of the mould skin is made of a silicone compound.

7. The method according to claim 1, wherein an exterior of the mould skin is coated with a release agent containing a petroleum wax or jelly.

8. A method of encapsulating bitumen in a bitumen bag comprising:
   melting a bitumen compound containing 10 to 30% by weight of natural bitumen and 5 to 25% by weight of a synthetic rubber polymer;
   coating the molten bitumen compound on a mould skin that is stretch over an expanded mould by rotating the mould and successively building up a thickness of the bitumen compound coating by stepwise translating the expanded mould under a plurality of nozzles dispensing the molten bitumen compound;
   once the thickness of the bitumen coating is attained to form a bitumen bag, moving the expanded mould into a water bath, reducing the mould volume and withdrawing the mould from the bitumen bag;
   translating the bitumen bag in the water bath and filling the bitumen bag with bitumen from a dispenser that is operated to translate with the bitumen bag and to reset to a start point at an end of stroke of translation;
   at the end of the water bath, moving the filled bitumen bag out of the water bath on an inclined conveyor; and
   cutting a filling port of the bitumen bag to leave a filling aperture, drying an area around the filling aperture and applying a patch seal to close the filling aperture to produce a block of bitumen encapsulated in the bitumen bag.

9. The method according to claim 8, wherein encapsulating bitumen is carried out continuously and bitumen bags thus produced are conveyed in the water bath on a conveyor.

10. The method according to claim 9, wherein the dispenser constitutes a gang of dispensers.

11. The method according to claim 8, wherein cutting of the filling port is carried out by a hot wire cutter.

12. The method according to claim 8, wherein drying the area around the filling aperture is carried out with a suction head.

* * * * *